United States Patent [19]

Sato et al.

[11] Patent Number: 5,385,338
[45] Date of Patent: Jan. 31, 1995

[54] APPARATUS FOR MELTING ALUMINUM ALLOY SCRAPS

[75] Inventors: Yasushi Sato, Toyama; Toshiharu Watanabe, Kanagawa, both of Japan

[73] Assignees: Miyamoto Kogyosho Co., Ltd., Toyoma; Fuji Electric Co., Ltd., Kanagawa, both of Japan

[21] Appl. No.: 46,315

[22] Filed: Apr. 15, 1993

[30] Foreign Application Priority Data

Apr. 24, 1992 [JP] Japan .................................. 4-131681
Mar. 1, 1993 [JP] Japan .................................. 5-066017

[51] Int. Cl.$^6$ ............................................. C22B 9/187
[52] U.S. Cl. .................................. 266/234; 75/10.18; 75/10.67; 266/901
[58] Field of Search ....................... 75/10.18, 686, 687, 75/10.13, 10.14, 10.16, 10.67; 266/234, 900, 901

[56] References Cited

U.S. PATENT DOCUMENTS

| | | | |
|---|---|---|---|
| 3,790,145 | 2/1974 | Gering | 266/900 |
| 4,128,415 | 12/1978 | van Linden et al. | |
| 4,589,637 | 5/1986 | Bamji et al. | 266/901 |
| 5,057,150 | 10/1991 | Reeve et al. | 75/678 |
| 5,106,411 | 4/1992 | Miki et al. | 75/10.67 |
| 5,135,202 | 8/1992 | Yamashita et al. | 75/687 |

FOREIGN PATENT DOCUMENTS

| | | |
|---|---|---|
| 0119094 | 9/1984 | European Pat. Off. . |
| 0133417 | 2/1985 | European Pat. Off. . |
| 0168250 | 1/1986 | European Pat. Off. . |
| 1533704 | 11/1978 | United Kingdom . |
| 2110244 | 6/1983 | United Kingdom . |
| 491007 | 2/1976 | U.S.S.R. .................. 266/901 |

Primary Examiner—Melvyn J. Andrews
Attorney, Agent, or Firm—Finnegan, Henderson Farabow, Garrett & Dunner

[57] ABSTRACT

Disclosed is a process for melting aluminum alloy scraps which comprises the steps of: giving a rotation force to molten metal reserved in a cylindrical chamber so that the molten metal is made swollen up along the inner circumferential surface of the cylindrical chamber by a centrifugal force caused by the rotation force while the liquid-phase surface of the molten metal is kept so as to draw a parabola to thereby produce a vortex flow in the molten metal; and introducing aluminum alloy scraps into the vortex flow. Further disclosed is an apparatus for melting aluminum alloy scraps which comprises: a furnace body; a melt-material introduction portion having a cylindrical shape and being provided in the furnace body so as to communicate with the furnace body so that molten metal in the furnace body circulates to flow into the melt-material introduction portion; and a moving magnetic field generator provided along the outer wall of the melt-material introduction portion so as to cover the outer wall of the melt-material introduction portion.

4 Claims, 2 Drawing Sheets

APPARATUS FOR MELTING ALUMINUM ALLOY SCRAPS

BACKGROUND OF THE INVENTION

1. Field of the Invention

The present invention relates to an aluminum alloy scrap melting process for melting aluminum alloy scraps such as aluminum alloy chips, aluminum alloy splinters, etc., and an apparatus for carrying out the process.

2. Prior Art

As a conventional aluminum alloy scrap melting process, there has been proposed a melting process comprising introducing scraps or chips into a vortex flow generated in molten metal which flows into a material introduction portion. On the other hand, an apparatus for generating a vortex flow in molten metal is known as disclosed in Unexamined Japanese Patent Publication (Kokai) Hei-1-132724, Hei-2-232323, Hei-3-120322, or the like.

The point common to the above Publications is as follows. That is, molten metal flows within a furnace so as to circulate, a round funnel-shaped vortex chamber is formed in a part of a passage of the molten metal, a vortex is generated as the molten metal is led from an upper port of the vortex chamber to a lower port of the vortex chamber, and aluminum alloy scraps or chips are therefore introduced into the furnace at the upper port of the vortex chamber. In the Publication Kokai Hei-1-132724, the circulation of the molten metal is performed by a molten metal stirring pump. In the Publication Kokai Hei-2-232323, the circulation of the molten metal is performed by an induction coil which is provided in the rear of an inclined portion which is provided so as to rise from a lower portion of the vortex chamber in the bottom of the furnace. In the Publication Kokai Hei-3-120322, the circulation of the molten metal is performed by an electromagnetic stirrer which is provided so as to be movable from the lower side of the vortex chamber to the upper side of the vortex chamber.

In the above-mentioned Publications, however, a difference in level is given to the circulating molten metal so that the molten metal can be poured into the vortex chamber from above and can be discharged from the lower of the vortex chamber. Accordingly, there arises a problem that a large-capacity electromagnetic stirrer is required. Further, as described above, the vortex chamber is formed to a funnel shape. Accordingly, there arise other problems, for example, that not only the structure of the inside of the furnace becomes complex but high-grade accuracy in finished size is required at the time of construction of the furnace so that a vortex can be generated securely relative to the flow rate of the molten metal.

SUMMARY OF THE INVENTION

An object of the present invention is therefore to solve the problems in the prior art.

According to the present invention, it is provided an aluminum alloy scrap melting process in which not only a vortex can be generated securely in a simple-structure furnace but the vortex acts not as a simple vortex flow but as a vortex which operates as if it is a crucible produced by the molten metal so that the molten metal can pour down on scraps introduced into the crucible to thereby accelerate melting of the scraps.

A further object of the present invention is to provide an aluminum alloy scrap melting apparatus for carrying out the above process.

In order to attain the foregoing objects, according to an aspect of the present invention, the process for melting aluminum alloy scraps comprises the steps of: giving a rotation force to molten metal reserved in a cylindrical chamber so that the molten metal is made swollen up along the inner circumferential surface of the cylindrical chamber by a centrifugal force caused by the rotation force while the liquid-phase surface of the molten metal is kept so as to draw a parabola to thereby produce a vortex flow in the molten metal; and introducing aluminum alloy scraps into the vortex flow.

According to another aspect of the present invention, the apparatus for melting aluminum alloy scraps comprises: a furnace body; a melt-material introduction portion having a cylindrical shape and being provided in the furnace body so as to communicate with the furnace body so that molten metal in the furnace body circulates to flow into the melt-material introduction portion; and a moving magnetic field generator provided along the outer wall of the melt-material introduction portion so as to cover the outer wall of the melt-material introduction portion.

Further, it is preferable that an annular protuberant stripe is provided on the inner circumferential surface of the melt-material introduction portion in a position higher than the liquid-phase surface of the molten metal in the melt-material introduction portion. Alternatively, it is preferable that a plurality of projections are provided on the inner circumferential surface of the melt-material introduction portion so as to extend upward from a position corresponding to the liquid-phase surface of the molten metal in the melt-material introduction portion. Alternatively, it is preferable that a plurality of projecting stripes are provided radially on the bottom portion of the melt-material introduction portion.

DESCRIPTION OF THE PREFERRED EMBODIMENTS

Figure 1:
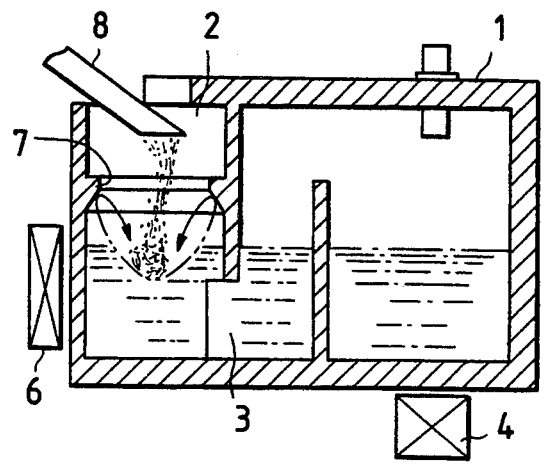
FIG. 1 is a longitudinal sectional view showing a waste aluminum alloy melting apparatus according to the present invention.
Figure 2:
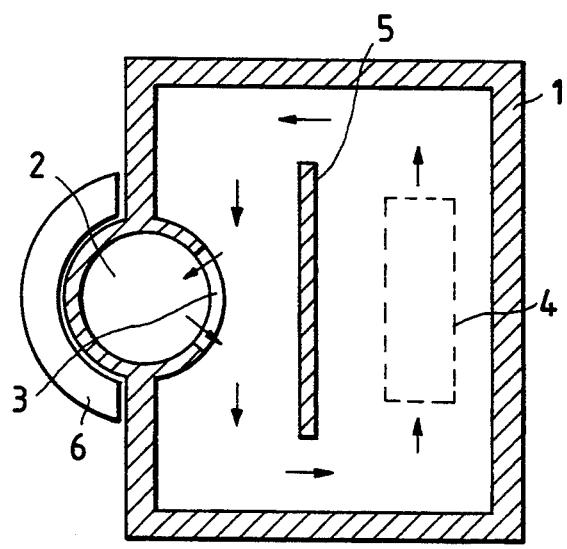
FIG. 2 is a transverse sectional view of the same.

The present invention will be described below specifically. As shown in FIGS. 1 and 2, a cylindrical melt-material introduction portion 2 is provided as a part of the furnace wall of a reflection type furnace body 1 so that at least a semi-cylindrical portion of the wall of the melt-material introduction portion 2 projects outward from the furnace wall. A passage 3 is provided in a lower portion of an inside furnace wall of the melt-material introduction portion 2 so that molten metal (original molten metal) in the furnace passes through the passage 3. Further, an electromagnetic stirrer 4 is provided in the rear side of the bottom of the furnace body 1 as well as a separator 5 is disposed within the furnace body 1 and in an intermediate portion between the passage 3 and the electromagnetic stirrer 4 so as to stand erect in parallel with the lengthwise direction of the electromagnetic stirrer 4, so that the molten metal is driven by the electromagnetic stirrer 4 to circulate within the furnace body 1 to thereby flow into the melt-material introduction portion 2. In FIG. 1, the reference numeral 8 designates a material injection pipe.

Further, a moving magnetic field generator 6 formed as an arch shape is provided along the semi-cylindrical wall (which extends outward from the furnace wall) of the melt-material introduction portion 2 so that the moving magnetic field generator 6 is mounted over a range of from the molten metal reserving position of the material introduction portion 2 to a higher position than the liquid-phase surface of the molten metal. Accordingly, when the moving magnetic field generator 6 is driven, a rotational centrifugal force is given to the molten metal in the melt-material introduction portion 2 to make the molten metal swollen along the inner wall of the melt-material introduction portion 2 as describing a parabola to thereby produce a crucible state of the molten metal in the melt-material introduction portion 2.

Further, as shown in FIG. 1, an annular protuberant portion 7 may be provided on the inner wall of the melt-material introduction portion 2 so as to be inward protuberant in a higher position than the liquid-phase surface of the molten metal in the melt-material introduction portion 2. In this case, the molten metal is made swollen along the inner wall of the melt-material introduction portion 2 by application of a centrifugal force to the molten metal through driving of the moving magnetic field generator 6, but the swelling of the molten metal is inhibited by the annular protuberant portion 7 so that the swollen molten metal can pour down into the center of the melt-material introduction portion 2. Thus, the crucible state can be produced securely.

Figure 4:
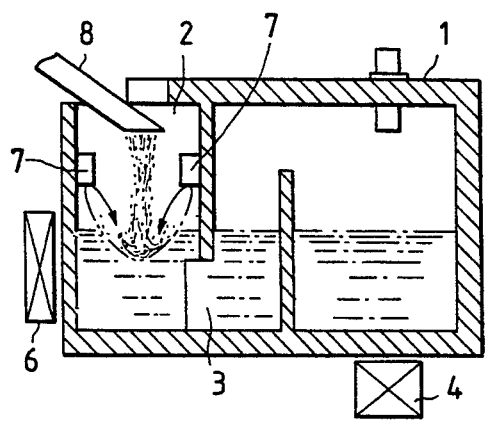
FIG. 4 is a longitudinal sectional view showing another similar example of the apparatus according to the present invention.
Figure 5:
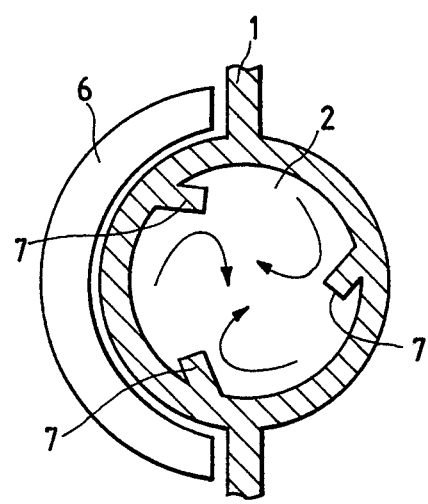
FIG. 5 is a transverse sectional view of important part of the same.

As another case of producing the crucible state of the molten metal, as shown in FIGS. 4 and 5, a plurality projections 9 may be disposed at intervals in the inner circumference of the melt-material introduction portion 2 so as to extend upward from a position corresponding to the liquid-phase surface of the molten metal on the inner wall of the melt-material introduction portion 2. Also in this case, the swelling of the liquid-phase surface of the molten metal is inhibited in a manner similar to that in the case of the annular protuberant stripe 7. Thus, the crucible state can be produced.

Figure 6:
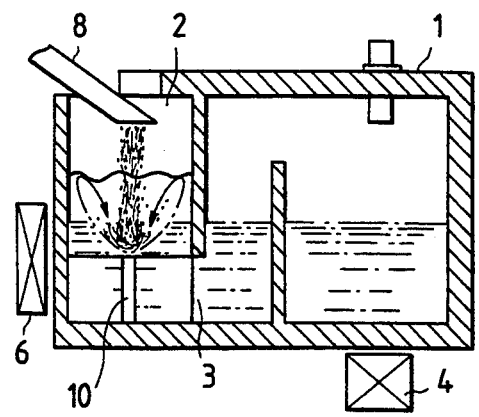
FIG. 6 is a longitudinal sectional view showing a further similar example of the apparatus according to the present invention.
Figure 7:
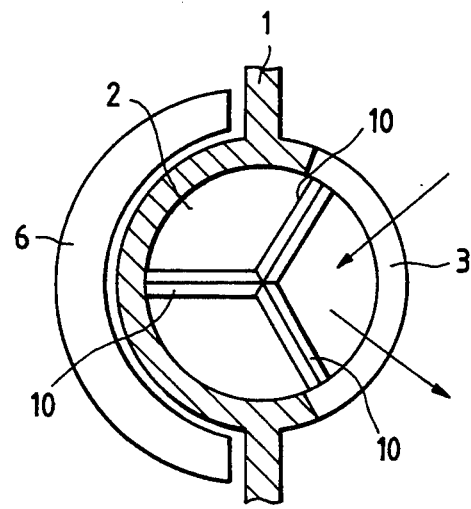
FIG. 7 is a transverse sectional view of important part of the same.

Alternatively, as shown in FIGS. 6 and 7, a plurality of projecting stripes 10 may be provided in the bottom portion the melt-material introduction portion 2 so as to project radially from the center of the melt-material introduction portion 2. In this case, the liquid-phase surface of molten metal swollen by a centrifugal force is made to be rolled wavy, so that the molten metal can be dropped down from the upper end portion.

Figure 3:
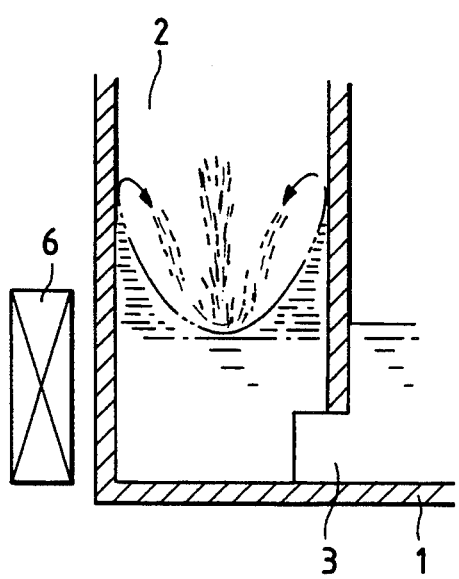
FIG. 3 is a longitudinal sectional view showing important part of a similar example of the apparatus according to the present invention.

Accordingly, the molten metal is made to flow into the melt-material introduction portion 2 by means of the electromagnetic stirrer 4. Then, the molten metal in the introduction portion 2 is made swollen with a vortex flow produced along the inner wall of the introduction portion 2 by means of the moving magnetic field generator 6. Then, the swollen molten metal is forcibly limited so as to pour down into the center of the introduction portion 2 by means of the annular protuberant stripe 7, the projections 9 or the projecting stripes 10. Thus, as shown in FIGS. 2 through 4, scraps as melt-material being dropping down are enclosed in the molten metal which is pouring down, so that the scraps are involved in the vortex of the reserved molten metal.

The present invention has the following effects. The aluminum alloy scrap melting process according to the present invention comprises introducing aluminum alloy scraps into a vortex flow generated in molten metal reserved in a cylindrical chamber, the vortex flow being generated by application of a rotation force to the molten metal to make the molten metal swollen up along the inner circumferential surface of the cylindrical chamber through a centrifugal force produced by the rotation force to keep the liquid-phase surface of the molten metal as describing a parabola. Accordingly, the scraps which are dropping down are enclosed in the molten metal, so that the scraps are involved in the vortex of the reserved molten metal. Furthermore, because a crucible state is constituted by the molten metal so that the atmosphere thereof can be kept at a high temperature, there is no lowering of the temperature of the dropping molten metal. Furthermore, because the introduced scraps can be involved in the molten metal securely without floating up on the molten metal, not only the melting speed of the scraps can be improved but oxidation of the scraps can be prevented.

The apparatus according to the present invention comprises a furnace body, a melt-material introduction portion having a cylindrical shape and being provided in the furnace body so as to be communicated with the furnace body so that molten metal circulating within the furnace body flows into the melt-material introduction portion, and a moving magnetic field generator provided along the outer wall of the melt-material introduction portion. Accordingly, because a rotation force is forcibly given to the molten metal reserved in the melt-material introduction portion, injection of the molten metal into the melt-material introduction portion and discharge of the molten metal from the melt-material introduction portion can be performed easily by making the molten metal circulate within the furnace body. Accordingly, not only the structure of the furnace can be simplified greatly but the quantity of scraps to be melted can be adjusted by controlling the capacity of the moving magnetic field generator.

Furthermore, an annular protuberant stripe, a plurality of projections, or the like, may be provided on the inner wall surface of the melt-material introduction portion. Alternatively, projecting stripes may be provided on the bottom of the melt-material introduction portion. Accordingly, the molten metal swollen along the circumferential wall is inhibited by the annular protuberant stripe or the like so that the molten metal drops down. Because the dropping of the molten metal is accelerated so that the quantity of the dropping molten metal increases, the atmosphere of the inside of the melt-material introduction portion can be kept at a high temperature, that is, the lowering of the molten metal can be prevented. At the same time, the powdered scraps introduced into the melt-material introduction portion are enclosed in the molten metal without floating up on the molten metal. Accordingly, the scraps can be involved in the molten metal securely, so that not only the melting speed of the scraps can be improved but oxidation of the scraps can be inhibited.

What is claimed is:

1. An apparatus for melting aluminum alloy scraps, comprising:
   a furnace body having a bottom wall and at least one side wall defining a first chamber for containing molten metal;
   an introduction portion of the furnace body for accepting input of aluminum alloy scraps, the introduction portion having a vertically oriented, cylindrical wall incorporated in the side wall of the furnace body to define a second chamber in molten metal flow communication with the first chamber;
   magnetic field generating means, of semi-cylindrical shape, externally positioned in proximate relation to an exterior portion of the cylindrical wall for exerting horizontal rotational forces on the molten metal to produce a vortex flow of the molten metal in the second chamber; and
   at least one element positioned in the second chamber for controlling the molten metal therein.

2. The apparatus of claim 1, wherein the controlling element is an annular protuberance projecting from the cylindrical wall into the second chamber at a vertical location to control the height of the molten metal in the second chamber.

3. The apparatus of claim 1, wherein the controlling element comprises a plurality of circumferentially spaced projections extending from the cylindrical wall into the second chamber at corresponding vertical locations to control the height of the molten metal in the second chamber.

4. The apparatus of claim 1, wherein the controlling element comprises a plurality of stripes extending radially from a lower central location in the second chamber upwardly to circumferentially spaced locations on the cylindrical wall, whereby to impart a wavy motion to the vortex flow of the molten metal in the second chamber.

* * * * *

UNITED STATES PATENT AND TRADEMARK OFFICE
CERTIFICATE OF CORRECTION

PATENT NO. : 5,385,338
DATED : January 31, 1995
INVENTOR(S) : Yasushi SATO et al It is certified that error appears in the above-indentified patent and that said Letters Patent is hereby corrected as shown below:

Inventors, Title Page, Line 1 before "Toshiharu" insert --Yoshinori Noma;--.

Inventors, Title Page, Line 2 change "Kanagawa, both of Japan" to --both of Kanagawa, all of Japan--.

Assingees, Title Page, Line 2 change "Toyoma" to --Toyama--.

Signed and Sealed this

Thirteenth Day of June, 1995

Attest:

BRUCE LEHMAN

*Attesting Officer*  *Commissioner of Patents and Trademarks*